Nov. 6, 1951   B. E. HARROLD ET AL   2,574,389
HEADREST FOR INSIDE WORK ON AUTOMOBILES
Filed Nov. 4, 1950
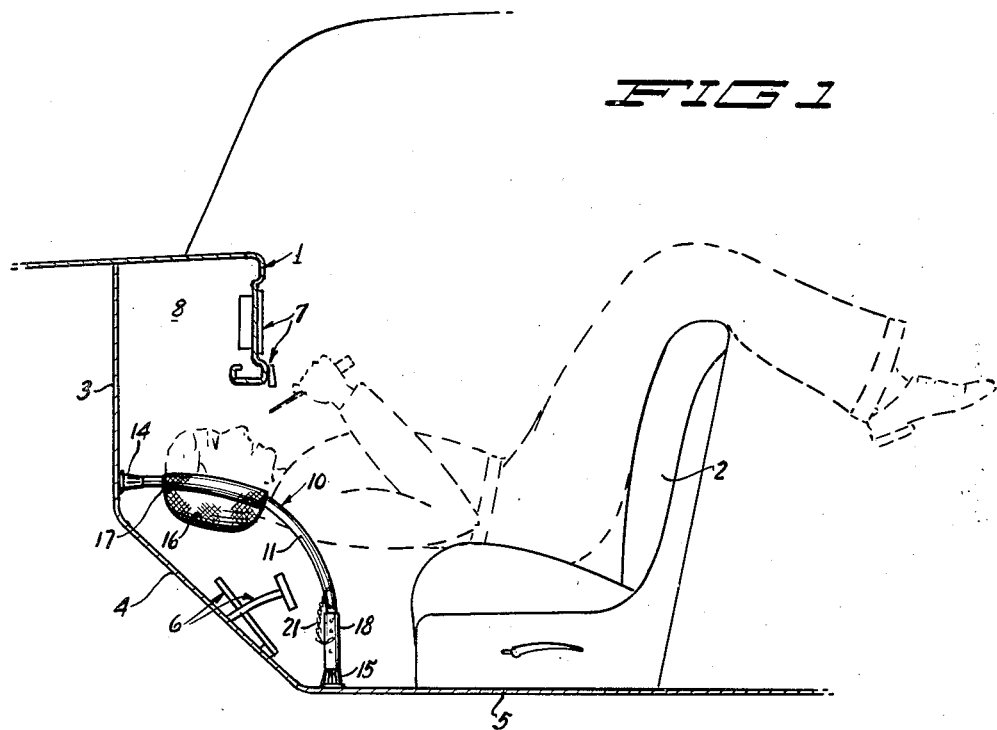
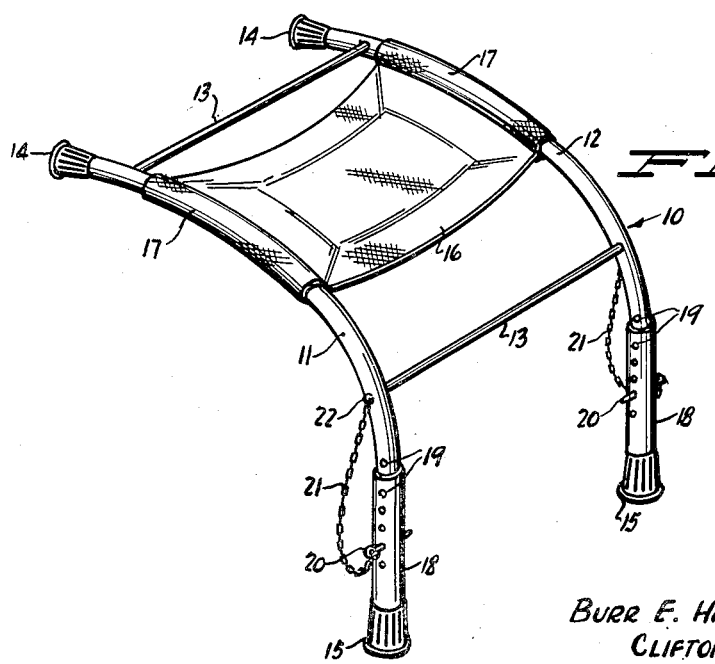
INVENTORS
BURR E. HARROLD
CLIFTON HUFFMAN, JR.
BY
ATTORNEY Patented Nov. 6, 1951

2,574,389

UNITED STATES PATENT OFFICE 2,574,389

HEADREST FOR INSIDE WORK ON AUTOMOBILES

Burr E. Harrold and Clifton Huffman, Jr., Montpelier, Ind.

Application November 4, 1950, Serial No. 194,130

6 Claims. (Cl. 155—173)

This invention relates to improvements in head rests for use by auto mechanics and others having occasion to do inside work upon automobiles.

The installation and servicing of radios, lights, switches, and the many other gauges and controls which are located on and behind the instrument panels of modern day automobiles is a difficult and tiring task for the reason largely that these parts are hard to get at and the mechanic must assume an uncomfortable contorted position, which frequently does not permit him to see the work to be done, or does not leave his hands free for such work. It is the primary object of our invention to provide a head rest which may be placed inside the automobile, forwardly of the front seat thereof, in such position that the mechanic or operator may rest his legs over the front seat and place his head on the head rest below and slightly forward of the instrument panel so as thus to support the head for a clearer view of the wiring and other elements behind the panel, while leaving both hands free for work. We find in practice that this head rest thus enables the operator to carry on this type of work comfortably and in a practical manner.

Another object of our invention is to provide a head rest of this nature which is exceedingly simple in construction and adaptable for use upon practically any present day motor vehicle, with provision made for adjustment for the height of the head support itself so as to properly locate this vital element with reference to the instrument panel and to the height of the front seat.

Still another object is to provide a head rest comprising a frame made up of arcuated side bars, rigidly cross connected in spaced relation, and provided in their extremities with non-skid rubber tips adapted to rest forwardly against the fire wall or front wall of the inside compartment of the automobile, and to rest downwardly upon the floor forward of the front seat immediately to the rear of the upwardly inclined portion of the floor whereon the clutch and brake pedals and other controls are usually mounted. This arcuated or curved formation of the frame provides clearance for the various control elements upon the floor of the vehicle and by connecting the side bars with a flexible padded strip or the like near the upper portions there is formed a comfortable and well positioned rest for the mechanic's or operator's head. Further in accordance with our invention, we provide a telescopic adjustable arrangement for the lower portions of the side bars to adjust the overall height of the frame not only to accommodate it to use in vehicles of different types but also properly position the head rest itself.

These and other more detailed and specific objects will be disclosed in the course of the following specification, reference being had to the accompanying drawings, in which—

Figure 1 is a vertical longitudinal and somewhat diagrammatic sectional view through the fore part of a conventional pleasure vehicle showing the instrument panel, the fire wall and floor line as well as the front seat of the vehicle and illustrating my invention as in use for resting the head of the mechanics working upon elements carried by the instrument panel.

Figure 2 is an enlarged perspective view of the head rest assembly alone and as removed from the vehicle.

Referring now more particularly and by reference characters to the drawing, in Figure 1 thereof we have illustrated certain related portions of a conventional automobile having the instrument panel 1 which is supported forward and upward of the front seat 2 and located rearward of the conventional fire wall 3 which separates the passenger compartment from the engine space under the hood of the vehicle. The fire wall 3 merges with an upwardly and forwardly angled portion 4 of the floor 5 of the vehicle and it is, of course, upon this portion 4 that the usual brake and clutch pedals, accelerator and related control elements operated by the drivers' feet are located, as designated generally at 6. The instrument panel 1 carries a great number and variety of control and indicator elements, as designated generally at 7, and the installation and servicing of these parts requires that the mechanic work in the comparatively cramped space 8 between the fire wall and instrument panel as is well known. It is also well known that it is difficult for the mechanic to assume a position at which he can view these parts needing attention while at the same time leaving his hands free for work with the necessary tools in the comparatively cramped quarters represented by the forward portion of the usual vehicle.

In accordance with our invention, therefore, we provide a head rest assembly, indicated generally at 10, made up of tubular side bars 11 and 12 rigidly held in parallel spaced relation by upper and lower cross bars 13. The side bars 11 and 12 are curved or arcuated as clearly shown in the drawing so as to present horizontally turned upper ends and vertically depending lower ends well adapted to rest forwardly and downwardly, respectively, against the fire wall 3 and the floor 5 of the vehicle. These upper ends of the frame assembly are provided with conventional non-skid rubber tips 14 to bear against the fire wall 3 while the lower ends have corresponding non-skid tips 15 to rest upon the floor and thus hold the frame in position against displacement in any direction when the operator or mechanic places his head in the head rest. The arcuate shape of the frame, in addition to presenting its ends in proper directions for bearing against the fire wall and floor, also provides space to clear the controls 6 upon the upwardly and forwardly angled portion 4 of the floor as clearly seen in Figure 1. Any suitable form of head rest is then provided upon the upper portion of this frame and as here shown the same provides a flexible padded fabric strip or support 16, the ends of which are looped at 17 around the upper portions of the side bars 11—12.

With this assembly positioned as described in the automobile, it is apparent that the operator or mechanic may assume a reclining position with his legs thrown over the back of the seat 2 and with his head supported in the head rest or support 16, which position is not only comfortable as compared to any other which might be assumed for the work, but also locates the mechanic's head downwardly and forwardly with respect to the instrument panel so that he may view the back thereof with the associated wiring or other elements to be installed or repaired. Such position also leaves both of the operator's hands and arms free for work either behind the instrument panel or in front thereof as the case may be.

Not only to adjust the overall size of the frame to vehicles of different types but to raise and lower the head rest or support 16 with reference to the instrument panel we provide for vertical adjustment of the frame by telescoping the lower ends of the side bars 11—12 into tubular standards 18, which carry the non-skid tips 15 at their lower ends. The lower ends of the side bars as well as the standards 18 are then provided with spaced adjustment openings 19 which may be aligned at various adjusted positions of the parts and the adjustment then fixed by means of pins 20 inserted diametrically through the aligned openings. It will, of course, be obvious that this adjustment will effectively raise and lower the head rest 16, as well as vertically adjust the upper tips 14 as may be required to properly fit the fire wall of different types of automobiles or to clear obstructions thereon. Such adjustment may also be made according to the height of the front seat 2 for the most comfortable position of the mechanic. So that the pins 20 may not become lost or mislaid at any time we attach thereto light chains 21, the opposite ends of which are secured permanently at 22 to the side bars 11—12 some distance above the standards 18 as clearly shown.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. For supporting the head of a person working inside a motor vehicle on parts on and beneath the instrument panel thereof, a frame having non-skid elements for supporting engagement with the fire wall and floor of the vehicle, a head rest element on said frame, and means on the frame for raising and lowering the head rest to properly support the head with reference to the instrument panel.

2. A head rest for supporting the head of a workman inside a motor vehicle below the instrument panel while the workman rests on his back on the front seat of the vehicle and rests his legs over the back of that seat, the vehicle being of the type having a forward fire wall and a floor inclining upward and forward to meet the fire wall, said head rest comprising a frame having sides of arcuate shape to rest at lower ends of the floor and at forward ends forward against the fire wall above the floor and to thereby clear any controls on the inclined portion of the floor, and a head support between the upper portions of the frame sides.

3. A head rest for supporting the head of a workman inside a motor vehicle below the instrument panel while the workman rests on his back on the front seat of the vehicle and rests his legs over the back of that seat, comprising a frame having side bars and cross bars rigidly connecting the same, the said side bars being adapted to rest at their lower ends on the vehicle floor and curving forward at their upper ends to rest forward against the fire wall of the vehicle, and a flexible head support between the forwardly curved upper ends of the side bars.

4. A head rest for supporting the head of a workman inside a motor vehicle below the instrument panel while the workman rests on his back on the front seat of the vehicle and rests his legs over the back of the seat, comprising a frame having side bars and cross bars rigidly connecting the same, the said side bars being adapted to rest at their lower ends on the vehicle floor and curving forward at their upper ends to rest forward against the fire wall of the vehicle, a flexible head support between the forwardly curved upper ends of the side bars, and non-skid rubber tips on the ends of the side bars.

5. A head rest for supporting the head of a workman inside a motor vehicle below the instrument panel while the workman rests on his back on the front seat of the vehicle and rests his legs over the back of that seat, comprising a frame having side bars and cross bars rigidly connecting the same, the said side bars being adapted to rest at their lower ends on the vehicle floor and curving forward at their upper ends to rest forward against the fire wall of the vehicle, a flexible head support between the forwardly curved upper ends of the side bars, standards telescopically receiving the lower ends of the side bars and resting on the floor, the side bars and standards having adjustment openings, and pins for positioning in said openings to raise and lower the side bars and head support with respect to the vehicle floor.

6. A head rest for supporting the head of a workman inside a motor vehicle below the instrument panel while the workman rests on his back on the front seat of the vehicle and rests his legs over the back of that seat, comprising a frame having side bars and cross bars rigidly connecting the same, the said side bars being adapted to rest at their lower ends on the vehicle floor and curving forward at their upper ends to rest forward against the fire wall of the vehicle, a flexible head support between the forwardly curved upper ends of the side bars, and means at the lower ends of the side bars for raising and lowering the same with respect to the floor.

BURR E. HARROLD.
CLIFTON HUFFMAN, Jr.

REFERENCES CITED

The following references are of record in the file of this patent:

UNITED STATES PATENTS

| Number | Name | Date |
| --- | --- | --- |
| 971,428 | Bowman | Sept. 27, 1910 |
| 1,431,110 | Fromhart | Oct. 3, 1922 |
| 2,535,259 | Boyington | Dec. 26, 1950 |